United States Patent [19]
Sanders et al.

[11] Patent Number: 5,324,798
[45] Date of Patent: Jun. 28, 1994

[54] POLYMER FINISHING PROCESS

[75] Inventors: Janice E. Sanders, Bound Brook; George N. Foster, Bloomsbury; Edgar C. Baker, Bridgewater; Robert J. N. Bernier, Flemington, all of N.J.

[73] Assignee: Union Carbide Chemicals & Plastics Technology Corporation, Danbury, Conn.

[21] Appl. No.: 997,527

[22] Filed: Dec. 28, 1992

[51] Int. Cl.$^5$ ................................................ C08F 2/34
[52] U.S. Cl. .................................... 526/123; 526/212; 526/213; 528/490; 528/492; 528/499
[58] Field of Search ................... 526/123, 212, 213; 528/490, 492, 499

[56] References Cited

U.S. PATENT DOCUMENTS

| | | |
|---|---|---|
| 4,701,504 | 10/1987 | Mitchell et al. .................... 526/83 |
| 4,711,923 | 12/1987 | Zboril .................................. 524/323 |
| 4,818,799 | 4/1989 | Chatterjee et al. ................. 526/123 |
| 4,879,141 | 11/1989 | Chatterjee .......................... 427/213 |
| 5,064,878 | 11/1991 | Chatterjee .......................... 526/90 |

Primary Examiner—Joseph L. Schofer
Assistant Examiner—Tom Weber
Attorney, Agent, or Firm—Saul R. Bresch

[57] ABSTRACT

A finishing process for a polymer containing an active catalyst residue. Starting polymer has a crystallinity of less than 10 percent by weight and is maintained in an essentially oxygen free reaction zone at a temperature less than polymer sticking temperature. The polymer is stabilized and acids neutralized by adding 2, 6-di-tert-butyl-4-alkyl phenol and/or alkyl -3-(3-5 -di-tert-butyl-4-hydroxy phenyl)- propionate and zinc oxide, hydrotalcite, or a zeolite. Resulting polymer is then treated with catalyst deactivators including water, and then mixed with photo-oxidative stabilizers.

13 Claims, No Drawings

POLYMER FINISHING PROCESS

TECHNICAL FIELD

This invention relates to a process for finishing polymers containing an active catalyst residue.

BACKGROUND INFORMATION

Solution polymerization processes and their post-reactor finishing designs practice catalyst removal or catalyst deactivation during polymer recovery. The polymer solution from the polymerization is often treated with suitable agents to either neutralize or complex the catalyst residue to aid removal by washing or other means. Drying or devolatilization steps follow with attendant solvent and other material recovery steps. Additives are incorporated via a melt compounding step. These processes are complex and have high costs associated with them.

Non-solution processes, such as gas phase or liquid pool polymerization processes, often use a combination of water or steam treatment followed by a melt mixing step during which the catalyst deactivators and stabilizers are added. Moist nitrogen purging converts the aluminum alkyls to their corresponding alkanes and aluminum oxide, and frees the chlorine from the transition metal chlorides or aluminum alkyl chlorides for removal as hydrogen chloride. However, the transition metal residues will still be present to either form colored complexes with phenolic stabilizers or act as low temperature, oxidation catalysts. With moist nitrogen purging, the magnesium chloride component of, for example, a Ziegler-Natta catalyst system will form a hydrate. On heating above about 120° C. during melt compounding, the hydrated magnesium chloride will also release hydrogen chloride. In the presence of trace amounts of water and acid, the stabilizers will be broken down via dealkylation or ester hydrolysis reactions. These reactions limit the effectiveness of the additives, especially the stabilizers. Such adverse reactions are most likely to occur when the additives are simultaneously introduced into a continuous mixer with olefin polymer from the reactor which has undeactivated catalyst residues and low levels of water.

An improvement with respect to the above is achieved using a melt mixing process with sequential addition of the additives. This process is described in U.S. patent application Ser. No. 625,933, still pending. The process minimizes the chance of any adverse interactions, i.e., between the transition metal catalyst residues and additives such as phenolic or phosphite ester stabilizers. The catalyst residues are first deactivated in a separate step prior to the addition of the stabilizers or other additives. Sequential addition of the catalyst deactivators and the stabilizers in a continuous melt mixer maximizes stabilization efficiency and discoloration resistance (of natural and white pigmented resins) even with trace oxygen present.

Certain transition metal catalyzed olefin polymers having low crystallinity (less than about 10 percent) are inherently sensitive to thermal and photo-oxidation, however. This sensitivity results from high tertiary hydrogen and unsaturation concentrations in combination with catalyst residues or corrosion products, which can act as oxidation catalysts. It would be advantageous, then, to avoid subjecting these heat sensitive polymers to melt compounding for the purpose of catalyst deactivation and incorporation of additives for stabilization and other purposes. Also, the continuous mixer equipment, which is needed for melt compounding, adds significant cost to the polymer finishing process.

DISCLOSURE OF THE INVENTION

An object of this invention, therefor, is to provide a finishing process for heat sensitive polymers containing active catalyst residues whereby thermal oxidation is minimized, and process economics are favorable.

Other objects and advantages will become apparent hereinafter.

According to the present invention, the above object is met by providing a finishing process for a polymer containing an active catalyst residue comprising the following steps:

(i) introducing one or more ethylenically unsaturated monomers, a transition metal catalyst system, and, optionally, hydrogen into one or more reaction zones in such amounts and under such polymerization conditions that a polymer will be produced having a crystallinity of less than about 10 percent by weight;

(ii) maintaining the reaction zone(s) at a temperature below the sticking temperature of the polymer and in an essentially oxygen-free atmosphere;

(iii) introducing into the said reaction zone(s) (a) 2,6-di-tert-butyl-4-alkyl phenol and/or alkyl-3-(3,5-di-tert-butyl-4-hydroxy phenyl)-propionate wherein the alkyl group has 1 to 20 carbon atoms and is linear or branched chain, or a complex thereof, and (b) zinc oxide; a hydrotalcite containing magnesium, aluminum, and/or zinc cation(s); or a zeolite containing sodium, calcium, magnesium, and/or zinc cation(s) in sufficient amounts to stabilize the polymer and neutralize acid formed in post-reaction zone(s);

(iv) recovering the polymer from the reaction zone(s) and passing the polymer into one or more post-reaction dry-blending zones, said zone(s) being maintained at a temperature below the sticking temperature of the polymer and in an essentially oxygen-free atmosphere;

(v) contacting the polymer with water in an amount sufficient to hydrolyze any catalyst residue and liberate complexed phenolic compound(s);

(vi) introducing into the post-reaction zone(s), one or more catalyst deactivator compounds in an amount sufficient to essentially deactivate the hydrolyzed residue of the transition metal catalyst system; and (vii) introducing into the post-reaction zone(s), one or more thermal and/or photo-oxidation stabilizers in an amount sufficient to substantially prevent the thermal and photo-oxidation of the polymer.

DETAILED DESCRIPTION

The polymers, which are produced in subject process, are formed from one or more ethylenically unsaturated monomers. The polymers of particular interest are the polyolefins. Generally, the monomers useful in the production of olefin homopolymers and copolymers will have 2 to 20 carbon atoms, and preferably 2 to 12 carbon atoms. Examples of these monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, 1,4-hexadiene, dicyclopentadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoro-ethylene, and chlorotrifluoroethylene; and acrylic acid, methacrylic acid, and other similar unsaturated acids.

Copolymers of ethylene or propylene together with one or more higher alpha-olefins up to 8 or more carbon atoms are representative of the most useful polyolefin copolymers. Examples of copolymers, which include other than olefin monomers, are those in which the primary comonomer is ethylene; a second comohomer is ethyl acrylate, vinyl acetate, or a 3 to 8 carbon atom alpha-olefin; and the third comonomer is ethylidene norbornene or vinyl trimethoxy silane, vinyl triethoxy silane, vinyl isobutoxy silane, or other vinyl trialkoxy silanes.

The polymers and the processes used to prepare them have several common characteristics. The polymers are based on one or more ethylenically unsaturated monomers, which are brought into contact with a transition metal catalyst system, and, optionally, hydrogen. The active catalyst residue results from the use of the transition metal catalyst system, and the acid formed in the reaction zones has its origin with the same catalyst system. The process conditions are such that a polymer having a crystallinity of less than about 10 percent by weight is formed; preferred crystallinity is less than about 5 percent by weight.

In this polymer, it is desirable to have a tertiary hydrogen content of greater than about 60 atoms of tertiary hydrogen per 500 monomer repeat units where propylene is one of the monomers; greater than about 40 atoms of tertiary hydrogen per 500 monomer repeat units where 1-butene is one of the monomers; and greater than about 30 atoms of tertiary hydrogen per 500 monomer repeat units where 1-hexene is one of the monomers. The preferred tertiary hydrogen content, whatever the monomer, is greater than about 85 atoms of tertiary hydrogen per 500 monomer repeat units. Where a diene is present in the copolymer, an unsaturation content of greater than about 0.2 double bonds per 500 monomer repeat units is also desirable.

Polymerization processes, which have the above characteristics and can result in polymers having the described properties, are described in U.S. Pat. Nos. 4,302,566; 4,482,681; and 4,506,842. The particular conditions used to obtain the defined crystallinity and the tertiary hydrogen are as follows:

Crystallinity can be determined according to Arakawa and Wunderlich, Journal of Polymer Science, A2, volume 4, page 53 (1966) using Differential Scanning Calorimetry (DSC). Tertiary hydrogen is determined by using C-13 Nuclear Magnetic Resonance (NMR) Spectroscopy according to Carman and Wilkes, Rubber Chemistry Technology, volume 44, page 781 (1971).

The finishing process of subject invention is most useful with total residue polymerizations using a gas phase or liquid pool reactor configuration. The polymerization reactor is preferably a mechanically stirred or gas fluidized bed reactor. Olefin polymers such as very low density polyethylenes, ethylene/propylene rubbers, elastomeric polypropylene, and olefin polymers having high unsaturation or diene content, e.g., ethylene/propylene/diene rubbers, which are produced using a titanium or a vanadium containing catalyst system, can particularly benefit from this process.

The two types of compounds used in step (iii) function, respectively, in the post-reactor phase, as (a) thermal oxidation compounds, which stabilize the polymer product, and (b) as acid neutralizers, which prevent corrosion. The compounds can also be introduced as stabilizers in step (vii). Examples of the former, i.e., the 2,6-di-tert-butyl-4-alkyl phenols are as follows: 2,6-di-tert-butyl-4-methylphenol; 2,6-di-tert-butyl-4-ethylphenol; and 2,6-di-tert-butyl-4-butyl phenol; decyl-3-(3,5-di-tert-butyl-4-hydroxy phenyl)propionate; dodecyl-3-(3,5-di-tert-butyl-4-hydroxy phenyl)-propionate; and octodecyl-3-(3,5-di-tert-butyl-4-hydroxy phenyl)-propionate. The alkyl group can be linear or branched chain. These compounds are preferably introduced into the reactor with the aluminum alkyl cocatalyst. Mineral oil, liquid propylene, or other liquid comonomers can be used as carriers. Examples of the latter, i.e., the hydrotalcites and the zeolites, are hydrotalcites comprising mixed metal oxides, hydrates, or carbonates wherein the cations are principally magnesium, zinc, or aluminum, and zeolites comprising hydrated alkaline earth or zinc aluminum silicates. These compounds can be added with selected, fine particle size, inorganic materials, which act as fluidization aids or flow aids such as those mentioned in U.S. Pat. No. 4,994,534. While drying may not be needed, they should be kept in an inert environment before usage.

As used in this specification, the "catalyst deactivator compounds", also referred to as deactivator compounds or deactivators, are those which can function in the post-reactor mode to neutralize or deactivate the catalyst residue. These compounds are preferably added in liquid form, which can include aqueous dispersions or other non-aqueous forms such as solutions or dispersions in mineral oil or an organo-modified polydimethylsiloxane. The deactivator compounds are usually added to the inlet zone of a mixer. It is preferred that the polymer and deactivator are thoroughly mixed in the inlet or first mixing zone. A residence time of about 0.01 to about 10 hours in the mixer should be sufficient to provide the desired dispersion of additives.

As used in this specification, the "thermal or photooxidation stabilizer compounds", which may also be referred to as stabilizers or antioxidants, are also added in the post-reactor mode together with or after the deactivator compounds, preferably after and in liquid form. This addition is usually carried out in the mixer in a mixing zone following the mixing zone to which the catalyst deactivator compound is added. The mixing zone to which the thermal oxidation stabilizer compound is added can be referred to as the second mixing zone. The residence time in the second mixing zone is about 0.01 to about 10 hours and is preferably about 0.05 to about 5 hours. This residence time should provide the desired homogeneity in a conventional mixer.

Devolatilization, which is generally accomplished by the use of a vacuum, can be effected in the second mixing zone, a third mixing zone following the second, or in between the first and second mixing zones. Devolatilization is used to remove unreacted monomer or other volatiles such as solvents or additives to the reactor or volatiles from solutions or aqueous dispersions of additives.

The general purpose additives are added to a third zone with thorough mixing to provide an adequate dispersion. The residence time in the third mixing zone is in the range of about 0.01 to about 10 hours and is preferably about 0.05 to about 5 hours.

General purpose additives include all of the usual polymer additives except for the additives added in step (iii), the catalyst deactivators, and the thermal oxidation stabilizers. Examples of the general purpose additives are ultraviolet absorbers, antistatic agents, pigments, dyes, fillers, slip agents, fire retardants, plasticizers, processing aids, lubricants, smoke inhibitors, viscosity control agents, vulcanizing agents, crosslinking agents, crosslinking catalysts, crosslinking boosters, and antiblock/slip agents.

Based on 100 parts by weight of polymer the additives are generally added in about the following amounts:

| Additive | Total Parts by weight | |
|---|---|---|
| | Broad Range | Preferred Range |
| Component (iii)(a) | 0.005 to 0.5 | 0.02 to 0.2 |
| Component (iii)(b) | 0.02 to 1.0 | 0.05 to 0.5 |
| Catalyst deactivators | 0.02 to 1.0 | 0.05 to 0.5 |
| Thermal oxidation stabilizers (antioxidants) | 0.02 to 1.0 | 0.05 to 0.5 |
| General purpose additives | 0.02 to 50 | |

Mixtures of additives in each category can be introduced. The particular amounts selected in the respective ranges (other than the general purpose additives) will depend on the maximum specifications for the polymer in terms of ppm of transition metal and chloride, which could be, for example, 50 ppm and 500 ppm, respectively. Lower maximum specifications may allow for lower additive concentrations. The varying level of fluidization aids (typically, about 5 to 50 percent by weight of the polymer) can have an effect on optimizing the concentration of additives.

The advantages of the process described above are that the polymers show enhanced stability under processing conditions, heat aging, and outdoor weathering conditions; there are reductions in the cost of additives; the polymers show improvements in product performance, ease of handling liquid additives; eliminating dust hazards; and greater accuracy of additive additions.

The term "additive", in the singular or plural, as used in this specification is defined to mean compounds added to polymers, which enhance the properties of the polymer, such as the step (iii) stabilizer and acid neutralizer compounds, catalyst deactivators, thermal oxidation stabilizers, and general purpose additives other than the foregoing compounds. These additives can be added as the free additive or an adduct or complex of the additive, which can be transformed, under process conditions, e.g., with water or steam, to release the free additive. See step (v). The polymer is contacted with water in an amount sufficient to hydrolyze any catalyst residue and liberate the phenolic compounds added in step (iii), which are in complex form. Liberation of a complexed phenolic compound simply means that the phenolic compound in complex form reverts to its compound form. In this compound (or free) form, the compound remains in the blend. This can be accomplished via steam injection or with a moist nitrogen purge. Preferred complexes are those formed with aluminum, silane, or siloxane compounds. The free additive to be added to the reactor is preferably soluble in the polymer. Generally, the additives are added in the form of a liquid, a solution, a dispersion, a flowable powder, or in the pores of an adsorptive carrier such as silica or carbon. It will be understood by those skilled in the art that the form of the additive and the method of introducing the additive into the process will vary with the process conditions, particularly in the reactor, and the type of transition metal catalyst employed, but will be selected so that any additive introduced into the reactor or otherwise will have no adverse effect on the polymerization reaction or post-reactor processing. Miscible liquid systems and dispersions based, for example, on organo modified polydimethyl siloxanes or mineral oil are well suited to the post-reactor introduction of additives. Mass transfer of the deactivators and stabilizers can be enhanced if the base fluid for the liquid system or dispersion is a diluent or solvent for the polymer. Temperature and time conditions are adjusted to promote the "heat soaking" of the deactivator into the polymer mass provided that the maximum temperature is below the melting point of the polymer.

As noted, the system, including both reaction and post-reaction zones, is maintained at a temperature below the sticking temperature of the polymer. The term "sticking temperature" is the temperature at which, for example, the bed can no longer be fluidized because of agglomeration or chunking. A fluidization aid permits operation at higher temperatures because it raises the sticking temperature of the resin. All additives are preferably low melting or in liquid form, and are preferably hydrocarbon soluble. The system is also maintained essentially oxygen free (less than 0.1 percent by weight oxygen based on the weight of the atmosphere in the system). In order to achieve adequate mixing, temperatures above room temperature are used. These temperatures can be in the range of about 30° C. to about 70° C., or as high as about 80° C. when fluidization aids are present. In any case, dry-blending is used in subject process rather than melt blending.

The deactivators and stabilizers are preferably supplied in an oil carrier and are maintained in an inert atmosphere together with stirring and warming before use.

In the post-reactor zones, these additives are preferably injected and sprayed into a solids mixing device in order to effectively coat the polymer granules. A recommended spraying procedure follows:

The spray nozzle is directed onto the bed of granular polymer, away from the walls, center shaft, and mixing blades. The liquid additive stream is finely atomized to achieve the best coating on the granules, preferably using a hydraulic nozzle or a gas atomizing nozzle. Several spray nozzles can be placed along the length of the mixing device to achieve better spraying effectiveness. The residence time required to get uniform distribution will depend on the type of blending. A Littleford TM plow blender can obtain good distribution within one to three minutes. A Day TM conical mixer will require up to 60 minutes to get good additive distribution. In some cases, batch blenders are more desirable than continuous blenders to provide longer post-reaction residence times under essentially inert atmospheric conditions. A typical continuous mixer or blender can be described as a device in which the resin and additives can be mixed without excessive temperatures being generated.

As noted, the preferred technique for introducing the hindered phenol into the reactor is to mix it with the aluminum alkyl forming an aluminum alkyl adduct. The adduct liberates the phenol under a moist purge after discharge from the reaction zone. The preferred technique for introducing the zinc oxide, the hydrotalcite, or the zeolite into the polymerization reactor is to feed it directly or mix it with the silica, which is used as a catalyst support.

The process is carried out in an essentially inert or oxygen free atmosphere until the thermal and/or photo-oxidation compounds of step (vii) are adequately mixed with the resin. Then, the general purpose additives can be added to complete the finishing process. The final post-reaction step may include either pelletizing or baling of the final product. It is important that the additives are not permitted to remain static; therefore, continuous mixing is recommended.

Preferred combinations of compounds utilized in subject process are generally as follows:

(1) Type I Stabilizer per se or in combination with Type II or Type III Stabilizers;

(2) Type I Stabilizers in combination with Type IV Stabilizers;

(3) The combination of Types I, II, and IV Stabilizers;

(4) The above Stabilizers as set forth in items (1), (2), or (3) in combination with the following Types of Deactivators:

(i) Type I;
(ii) the combination of Types I and II;
(iii) Type IV; and
(iv) Type V.

Type I, II, and III Stabilizers are thermal oxidation stabilizers. Type IV is a photo-oxidation stabilizer.

Examples of the above Types follow:

Type I Stabilizers:
alpha-tocopherol;
2,2'-ethylidenebis-(2,4-di-tert-butylphenol);
4,4'-methylenebis-(2,6-di-tert-butylphenol);
2-butyloctyl-3-(3,5-di-tert-butyl-4-hydroxy phenyl)-propionate;
octadecyl 3-(3,5-di-tert-butyl-4-hydroxyphenyl)-propionate (a preferred Type I stabilizer);
2-ethylhexyl-3-(3 ,5-di-tert-butyl-4-hydroxy phenyl)-propionate;
2,2'-methylenebis-(4-methyl-6-tert-butylphenol);
1,1,3-tris-(5-tert-butyl-4-hydroxy-2-methylphenyl)-butane;
polymeric 2,2,4-tri-methyl-1,2-dihydroquinoline;
4,4'-thiobis-(4-methyl-6-tert-butylphenol);
2,2'-thiodiethyl-bis-3-(3,5-di-tert-butyl-4-hydroxy-phenyl)-propionate;
2,2'-ethyleneglycol-bis-3-(3,5-di-tert-butyl-4-hydroxy-phenyl)-propionate;
1,3,5-tris-(3, 5-di-tert-butyl-4-hydroxy-benyl)isocyanurate;
1,3,5-tris-(3, 5-di-tert-butyl-4-hydroxybenyl) mesitylene;
1,3,5-tris-(4-tert-butyl-3-hydroxy-2,6-dimethylbenzyl)-1,3,5-triazine-2,4,6-(1H,3H,5H)-trione;
pentaerythrityltetrakis-3-(3,5-di-tert-butyl-4-hydroxyphenyl)-propionate;
functionalized polydimethylsiloxanes or polydimethyl, methylalkyl siloxanes containing:
propyl-3-(3,5-di-tert-butyl-4-hydroxyphenyl)-propanoate or
propyl-3-(3,5-di-tert-butyl-4-hydroxyphenyl); and
di-2,4-methylenethiooctyl-6-methyl-phenol.

Type II Stabilizers:
tris-nonylphenyl-phosphite;
tris-(2,6-di-tert-butylphenyl)-phosphite;
distearyl-pentaerythrityl-diphosphite;
bis-(2,4-di-tert-butylphenyl)-pentaerythrityl-diphosphite;
bis-(2,6-di-tert-butyl-4-methylphenyl)-pentaerythrityl-diphosphite;
tetrakis-(2,4-di-tert-butylphenyl)4,4'-biphenylylene-diphosphonite;
2,2'-ethylidenebis-(4,6-di-tert-butylphenyl) fluorophosphite.

Type III Stabilizers:
dilauryl thiodipropionate;
ditriisodecyl thiodipropionate (a preferred Type III stabilizer);
distearyl thiodipropionate.

Type IV Stabilizers:
bis(2,2,6,6-tetramethyl-4-piperidinyl) sebacate;
bis(1,2,2,6,6-pentamethyl-4-piperidinyl) sebacate;
dimethyl succinate polymer with 4-hydroxy-2,2,6,6-tetramethyl-1 -piperidine ethanol;
N-N'-bis-(2,2,6,6-tetramethyl-4- piperidinyl)-1,6-hexanediamine, polymer with 2,4,6-trichloro- 1,3,5-triazine and 2,4,4-trimethyl-1,2-pentanamine;
poly[(6-morpholono-s-triazine-2,4-diyl) [2,2,6,6-tetramethyl-4-piperidyl)imino ]-hexamethylene[(2, 2,6,6-tetramethyl-4-piperidyl)imino]]
functionalized polydimethylsiloxanes or polydimethyl, methylalkyl siloxanes having:
2,2,6,6-tetramethyl-4-piperidinoxy; propyl-3-(2,2,6,6-tetramethyl-4-piperidinoxy); or
octyl-8-(2,2,6,6-tetramethyl-4-piperidinoxy).

Type I Deactivators:
N,N-di-hydroxymethyl-dodecylamine
N,N-di-2-hydroxyethyl-pentadecylamine
N,N-di-hydroxymethyl-pentadecylamine
N,N-di-hydroxymethyl-octadecylamine
N,N-bis[hydroxymethyl]2-hexyldecylamine
N,N-bis[hydroxymethyl]2-octyldodecylamine
N,N-bis[hydroxyethyl]2-octyldodecylamine
The preferred Type I Deactivators are:
N,N-di-2-hydroxyethyl-octadecylamine;
N,N-di-2-hydroxyethyl-dodecylamine;
N,N-di-bis(2-hydroxyethyl)-2-butyloctyl amine;
N,N-di-bis[2-hydroxyethyl]2-hexyldecylamine; and
N,N-di-bis(2-hydroxyethyl)-2-octyldodecylamine Type II Deactivators:
alkali metal, alkaline earth metal, or zinc octoate, laurate, stearate, 12-hydroxy stearate, stearoyl lactylate, or montanate. Examples of the alkali and alkaline earth metals are sodium, calcium, and magnesium.

Type III Deactivators:
glyceryl mono- and di-stearate, 12-hydroxy stearate and montanate esters, sorbityl mono-, di- and tri- stearate, 12-hydroxy stearate and montanate esters, pentaerythrityl mono-, di- and tri-stearate, 12-hydroxy stearate and montanate esters.

Type IV Deactivators:
functionalized polydimethylsiloxanes or polydimethyl, methylalkyl siloxanes having:
3-hydroxypropyl,
8-hydroxyoctyl,
propyloxy propanediol, propyl glycidyl ether,
propyloxypolyethyleneoxide(about 350 daltons),
ethylcyclohexanemonoxide,
N,N-dimethylpropylamine,
N,N-di-hydroxymethylpropylamine, or
N,N-di-2-hydroxyethylpropylamine substituents.

Examples of suggested combinations of the above are as follows (combinations 1 and 3 are preferred):

1. octadecyl 3-(3,5-di-tert-butyl-4-hydroxyphenyl)-propionate; and
N,N-bis-[2-hydroxyethyl]-2-hexyldecylamine.

2. pentaerythrityl tetrakis-3-(3,5-di-tert-butyl-4-hydroxyphenyl)-propionate;
tris-(2,6-di-tertbutylphenyl)-phosphite; and
N,N-di-2-hydroxyethy 1-octadecylamine.

3. octadecyl 3-(3,5-di-tert-butyl-4-hydroxyphenyl)-propionate;
N,N-bis-[2-hydroxyethyl]-2-hexyldecyl amine and
zinc stearate.

4. octadecyl 3-(3,5-di-tert-butyl-4-hydroxyphenyl)propionate;
tris-(2,6-di-tert-butylphenyl)-phosphite; and
N,N-di-2-hydroxyethyl-octadecylamine.

5. octadecyl 3-(3,5-di-tert-butyl-4-hydroxyphenyl)-propionate;
2,2'-ethylidenebis-(4,6-di-tert-butylphenyl) fluorophosphite; and
N,N-di-2-hydroxyethy 1-oct adecyl amine.

6. octadecyl 3-(3,5-di-tert-butyl-4-hydroxyphenyl)-propionate;
tris-nonylphenyl-phosphite; and
zinc stearate.

7. octadecyl 3-(3,5-di-tert-butyl-4-hydroxyphenyl)-propionate;
pentaerythrityl tetrakis-3-(3,5-di-tert-butyl-4-hydroxyphenyl)-propionate;
ditriisodecyl thiodipropionate; and
N,N-di-2-hydroxyethyl-octadecylamine.

8. octadecyl 3-(3,5-di-tert-butyl-4-hydroxyphenyl)-propionate;
pentaerythrityl tetrakis-3-(3,5-di-tert-butyl-4-hydroxyphenyl)-propionate; and
3-hydroxypropyl functionalized polydimethylsiloxane.

9. octadecyl 3-(3,5-di-tert-butyl-4-hydroxyphenyl)-propionate; and
N, N-di- 2-hydreoxyethyl-3-propylamino functionalized polydimethysiloxane.

The advantages of subject process are the avoidance of a catalyst residue removal step (de-ashing); the avoidance of thermal abuse; the production of low crystallinity, olefin polymers having enhanced stability and enhanced heat aging and outdoor weathering properties; and the promotion of mass transfer into the polymer mass without adverse oxidation effects.

The patent application and patents mentioned in this specification are incorporated by reference herein.

The invention is illustrated by the following examples.

EXAMPLE 1

This example provides a screening test for various thermal oxidation compounds adapted to substantially prevent the thermal oxidation of both monomers and the polymer product.

In this example, the polymer used is an ethylene/-propylene/ethylidene norbornene rubber (EPDM), which has been purged of residual ethylidene norbornene monomer. The EPDM is described as containing 60.7 percent by weight ethylene; 35.4 percent by weight propylene; and 3.9 percent by weight ethylidene norbornene.

It contains 65 ppm (parts by weight per million parts by weight of EPDM) of vanadium and 470 ppm of chlorine.

The test is accomplished using Differential Scanning Calorimetry (DSC) to determine Oxidative Induction Time (OIT) measured at 180° C. as follows: a 5 milligram sample is heated under nitrogen from room temperature to 180° C. When the system is isothermal, oxygen gas is introduced. The residence time from the switch to oxygen to the onset of the oxidative reaction is the OIT. The inherent stability of the polymer is measured by the time it takes to induce degradation changes during controlled thermal abuse in an oxidizing environment, i.e., the OIT.

The OIT is given in minutes. The longer the time, the better the stabilizer. The stabilizers are as follows:

A Octadecyl 3-(3,5-di-tert-butyl-4-hydroxyphenyl)-propionate
B di-2,4-methylenethiooctyl-6-methylphenol
C higher alkyl (C12 to C16) 3-(3,5-di-tert-butyl-4-hydroxyphenyl)-propionate
D mixed butylated, styrenated para-cresol
E hydrotalcite containing magnesium and aluminum cations
F zinc oxide
G branched alkyl (C14 to C16)-di-2-hydroxyethyl amine
H octadecyl-di-2-hydroxyethyl amine

| | Stabilizer or mixture of stabilizers | OIT (min) |
|---|---|---|
| 1. | neat | <0.2 |
| 2. | 500 ppm of A | 1.9 |
| 3. | 1000 ppm of A | 2.1 |
| 4. | 1000 ppm of A plus 1500 ppm of E | 3.4 |
| 5. | 2000 ppm of B | 5.1 |
| 6. | 1000 ppm of B | 5.8 |
| 7. | 2000 ppm of A | 6.2 |
| 8. | 1000 ppm of C | 6.8 |
| 9. | 1000 ppm of C plus 1500 ppm of F | 7.4 |
| 10. | 2000 ppm of C | 11.8 |
| 11. | 2000 ppm of D | 12.5 |
| 12. | 2000 ppm of A, 1500 ppm of F, and 2% G | 14.0 |
| 13. | 1000 ppm of B, 1500 ppm of E, and 2% H | 14.9 |
| 14. | 1000 ppm of B, 1500 ppm of E, and 2% G | 15.6 |
| 15. | 1000 ppm of B plus 1500 ppm of E | 22.0 |
| 16. | 2000 ppm of A, 1500 ppm of F, and 2% H | >30.0 |
| 17. | 2000 ppm of A, 1500 ppm of E, and 1% H | >30.0 |
| 18. | 2000 ppm of A, 1500 ppm of E, and 0.5% H | >30.0 |

Note: % is percent by weight based on the weight of the polymer.

EXAMPLE 2

The same polymer is used in this example as in Example 1.

The additives are A, F, H, and dilauryl thiodipropionate (for A, F, and H, see example 1)

| | | Initial OIT at 180° C. (minutes) |
|---|---|---|
| 1. | baled resin (additives dry blended) | 10.7 |
| 2. | baled resin (high viscosity mineral oil used | 12.6 |

-continued

| | Initial OIT at 180° C. (minutes) |
|---|---|
| as additive carrier) | |

EXAMPLE 3

This example measures the volatility of certain stabilizers using thermogravimetry. The time is measured in minutes to achieve a 50 percent weight loss at 150° C. under a 50 cubic centimeter per minute flow of nitrogen. It is preferred that the more volatile stabilizers are used in the polymerization reactor.

The stabilizers are as follows:

I 2,6-di-tert-butyl-4-methylphenol
J 2,6-di-tert-butyl-4-ethylphenol
K 2,6-di-tert-butyl-4-butylphenol
L pentaerythrityl tetrakis-3-(3,5-di-tert-butyl-4-hydroxyphenyl)-propionate
A (for A, see example 1)

| Stabilizer | Time (minutes) |
|---|---|
| I | 5.0 |
| J | 7.3 |
| K | 11.4 |
| A | >60.0 |
| L | >60.0 |

EXAMPLES 4 to 7

Granular EPDM is prepared in a fluidized bed reactor in accordance with U.S. Pat. Nos. 4,302,566; 4,482,681; and 4,506,842. See example 1 for the composition of the EPDM.

The additives are as follows:

I (for I, see example 3)
F (zinc oxide)
M (diethanolstearyl amine)
N (dilauryl thiodipropionate)
A (for A, see example 1)

Additives I and F are added to the reactor. Additive I is added with the triethylaluminum. Additive F is added at the beginning, in the middle, and at the end of the polymerization.

After the polymerization, the resin passes into a purge bin where it is treated with steam and then to a mixing device. These are the post-reactor zones.

In examples 4 to 7, the additives are added sequentially. Additives I and F are added to the reactor as described above. The balance of the additives are added to the mixing device as follows: Additives I and F first, then additive M, and finally additives N and A.

Examples 4 to 7 are carried out in an inert atmosphere. There is no exposure to atmospheric oxygen at any point in the polymerization or thereafter until the completion of post-reactor stabilization.

In examples 5 and 7, a low viscosity mineral oil is used as a solvent for additives M, N, and A.

The amounts of additives in percent by weight based on the weight of the polymer used in each example is set forth in Table I.

TABLE I

| Example | 4 | 5 | 6 | 7 |
|---|---|---|---|---|
| Additives: | | | | |
| reactor additives: | | | | |
| I | 0.05 | 0.05 | 0.05 | 0.05 |
| F | 0.20 | 0.20 | 0.20 | 0.20 |
| post-reactor additives: | | | | |
| I | 0.00 | 0.00 | 0.00 | 0.00 |
| F | 0.00 | 0.00 | 0.00 | 0.00 |
| M | 0.40 | 0.40 | 0.40 | 0.40 |
| N | 0.40 | 0.40 | 0.40 | 0.40 |
| A | 0.20 | 0.20 | 0.20 | 0.20 |

Analysis of the EPDM used in examples 4 to 7 are set forth in Table II. Vanadium and chloride are given in parts per million and carbon black fluidization aid (CB-FA) and ethylidene norbornene (ENB) are given in percent by weight based on the weight of the EPDM.

TABLE II

| Example | 4 | 5 | 6 | 7 |
|---|---|---|---|---|
| vanadium (ppm) | 38 | 38 | 85 | 85 |
| chloride (ppm) | 350 | 350 | 1150 | 1150 |
| CB-FA (wt %) | 9.0 | 9.0 | 27.8 | 27.8 |
| ENB (wt %) | 3.0 | 3.0 | 8.5 | 8.5 |

The EPDM polymers of examples 4 to 9 are each baled and heat aged at 120° C. in a forced air circulation oven and then sent to a DSC unit operated at 180° C. for OIT measurements in minutes. The initial OITs and the OITs taken after heat aging for designated periods of time are set forth in Table III.

TABLE III

| | | OIT (minutes) | | | | |
|---|---|---|---|---|---|---|
| Example | Initial | 6 days | 10 days | 14 days | 21 days | 49 days |
| 4 | 8.1 | — | — | 48.8 | 30.5 | 7.8 |
| 5 | 48.6 | — | — | 39.5 | 30.8 | <1 |
| 6 | 8.6 | 8.8 | <1 | — | — | — |
| 7 | 65.2 | 45.9 | — | — | <1 | — |

Polymer failure is defined as an OIT of less than one minute. This represents catastrophic failure of the polymer; extreme embrittlement is observed and the infrared spectra show intense carbonyl bonds associated with oxidation of the polymer chain. Heat stability of the polymer is a very important property. Thus, the longer it takes for a polymer to fail under a heat aging regime the better. For example, the OIT in example 4 is reduced to 7.8 minutes in 49 days, but in example 5, the OIT is reduced to less than one minute in the same period of time. In example 6, the polymer fails after 10 days and in example 7, the polymer fails after 21 days.

Vanadium and other elemental analyses are effected using an inductively coupled plasma spectrometer operated under standard conditions. Chloride analysis is accomplished via coulametric titration of the products formed in a Dohrman TM T-300-S cell, also using standard methods.

Bales are formed as follows: about 25 grams of polymer are preheated for 30 minutes at 60° C.; the polymer is then transferred to a 3.75 inch (outer diameter), 2 inch (inner diameter)×1 inch stainless steel mold. It is pressed for 10 seconds at 3 tons on a preheated Carver TM press. The bale looks like a little hockey puck.

The baled polymer is allowed to cool to room temperature and sampled for a beginning OIT value. The bale is then divided and a part placed in a 120° C. air circulation oven while the other part is placed in a constant temperature (60° C.) room.

We claim:

1. A finishing process for a polymer containing an active catalyst residue comprising the following steps:
   (i) introducing one or more ethylenically unsaturated monomers, a transition metal catalyst system, and, optionally, hydrogen into one or more reaction zones in such amounts and under such polymerization conditions that a polymer will be produced having a crystallinity of less than about 10 percent by weight wherein the polymerization is a gas phase polymerization or a liquid pool polymerization, the liquid pool being formed by the monomer(s);
   (ii) maintaining the reaction zone(s) at a temperature below the sticking temperature of the polymer and in an essentially oxygen-free atmosphere;
   (iii) introducing into the reaction zone(s) (a) 2,6-di-tert-butyl-4-alkyl phenol and/or alkyl-3-(3-5-di-tert-butyl-4-hydroxy phenyl)-propionate wherein the alkyl group has 1 to 20 carbon atoms and is linear or branched chain, or a complex thereof, and (b) zinc oxide; a hydrotalcite containing magnesium, aluminum, and/or zinc cation(s); or a zeolite containing sodium, calcium, magnesium and/or zinc cation(s) in sufficient amounts to stabilize the polymer and neutralize acid formed in the post-reaction zone(s);
   (iv) recovering the polymer from the reaction zone(s) and passing the polymer into one or more post-reaction dry-blending zones, said zones being maintained at a temperature below the sticking temperature of the polymer and in an essentially oxygen-free atmosphere;
   (v) contacting the polymer with water in an amount sufficient to hydrolyze any catalyst residue and liberate complexed phenolic compound(s);
   (vi) introducing into the post-reaction zone(s), one or more catalyst deactivator compounds in an amount sufficient to essentially deactivate the hydrolyzed residue of the transition metal catalyst system; and
   (vii) introducing into the post-reaction zone(s), one or more thermal and/or photo-oxidation stabilizers in an amount sufficient to substantially prevent the thermal and photo-oxidation of the polymer
with the proviso that, in said process, the polymer is not in a molten state.

2. The process defined in claim 1 wherein the polymer has a crystallinity of less than about 5 percent by weight.

3. The process defined in claim 1 wherein component (a) in step (iii) is a 2,6-di-tert-butyl-4-alkyl phenol and the alkyl group is methyl, ethyl, or butyl.

4. The process defined in claim 1 wherein component (a) in step (iii) is alkyl-3-(3,5-di-tert-butyl-4-hydroxyl phenyl)-propionate and the alkyl group has 10, 12, or 18 carbon atoms.

5. The process defined in claim 1 wherein component (b) in step (iii) is zinc oxide.

6. The process defined in claim 1 wherein component (b) in step (iii) is a hydrotalcite.

7. The process defined in claim 1 wherein component (b) in step (iii) is a zeolite.

8. The process defined in claim 1 wherein general purpose additives are introduced after step (vii).

9. The process defined in claim 1 wherein the additives are added in about the following amounts in parts by weight based on 100 parts by weight of polymer:

| Additive | Parts by Weight |
| --- | --- |
| Component (iii)(a) | 0.005 to 0.5 |
| Component (iii)(b) | 0.005 to 0.5 |
| Catalyst deactivators | 0.02 to 1.0 |
| Thermal oxidation stabilizers | 0.02 to 1.0 |

10. The process defined in claim 1 wherein the catalyst deactivator compounds introduced in step (vi) and the thermal and/or photo-oxidation compounds introduced in step (vii) are as follows:
    octadecyl 3-(3,5-di-tert-butyl-4-hydroxyphenyl)-propionate and
    N,N-bis-[2-hydroxyethyl]-2-hexyldecylamine.

11. The process defined in claim 1 wherein the catalyst deactivator compounds introduced in step (vi) and the thermal and/or photo-oxidation compounds introduced in step (vii) are as follows:
    octadecyl 3-(3,5-di-tert-butyl-4-hydroxyphenyl)-propionate;
    N,N-bis-[2-hydroxyethyl]-2-hexyldecylamine; and
    zinc stearate.

12. The process defined in claim 1 wherein the polymer is an ethylene/propylene/ethylidene norbornene rubber.

13. A finishing process for a polymer containing an active catalyst residue comprising the following steps:
    (i) introducing one or more ethylenically unsaturated monomers, a transition metal catalyst system, and, optionally, hydrogen into one or more reaction zones in such amounts and under such polymerization conditions that a polymer will be produced having a crystallinity of less than about 5 percent by weight wherein the polymerization is a gas phase polymerization or a liquid pool polymerization, the liquid pool being formed by the monomer(s);
    (ii) maintaining the reaction zones at a temperature below the sticking temperature of the polymer and in an essentially oxygen-free inert atmosphere;
    (iii) introducing into the reaction zones (a) 2,6-di-tert-butyl-4-alkyl phenol wherein the alkyl group is methyl, ethyl, or butyl, or a complex thereof, and (b) zinc oxide in sufficient amounts to stabilize the polymer and neutralize acid formed in the post-reaction zone(s);
    (iv) recovering the polymer from the reaction zone(s) and passing the polymer into one or more post-reaction dry-blending zones, said zones being maintained at a temperature below the sticking temperature of the polymer and in an essentially oxygen-free atmosphere;
    (v) contacting the polymer with water in an amount sufficient to hydrolyze any catalyst residue and liberate complexed phenolic compound(s);
    (vi) introducing into the post-reaction zone(s), one or more catalyst deactivator compounds in an amount sufficient to essentially deactivate the hydrolyzed residue of the transition metal catalyst system; and
    (vii) introducing into the post-reaction zone(s), one or more thermal and/or photo-oxidation stabilizers in an amount sufficient to substantially prevent the thermal and photo-oxidation of the polymer
with the proviso that, in said process, the polymer is not in a molten state.

* * * * *